F. W. WIDMANN.
CALF WEANER.
APPLICATION FILED SEPT. 9, 1910.

987,521.

Patented Mar. 21, 1911.

Witnesses

Francis Boyle

Inventor
F. W. Widmann
By 
Attorneys

UNITED STATES PATENT OFFICE.

FLORIAN W. WIDMANN, OF AVON, MINNESOTA.

CALF-WEANER.

987,521.

Specification of Letters Patent. Patented Mar. 21, 1911.

Application filed September 9, 1910. Serial No. 581,146.

*To all whom it may concern:*

Be it known that I, FLORIAN W. WIDMANN, a citizen of the United States, residing at Avon, in the county of Stearns, State of Minnesota, have invented certain new and useful Improvements in Calf-Weaners; and I do hereby declare the following to be a full, clear, and exact description of the invention, such as will enable others skilled in the art to which it appertains to make and use the same.

This invention relates to muzzles adapted to be attached to calves, colts and other young animals, which will effectively prevent them from nursing after being weaned.

The object of the present invention is to provide a muzzle of this character that will have novel spurs which will prick the calf instead of the mother.

Figure 1:
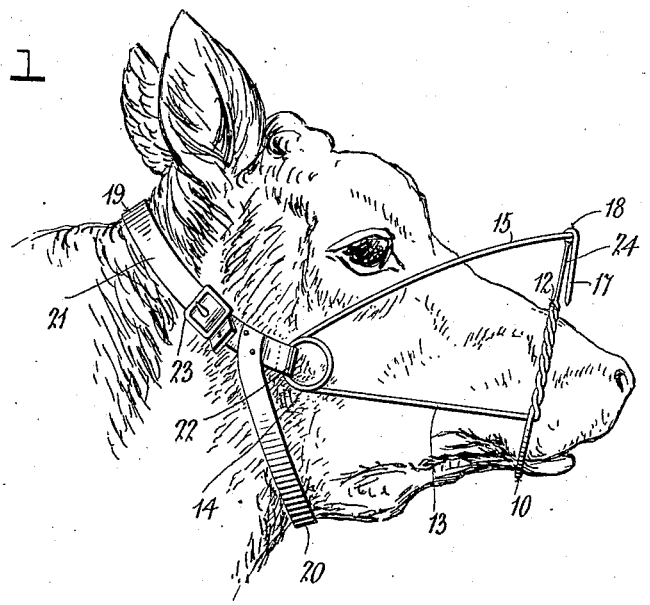
Figure 2:
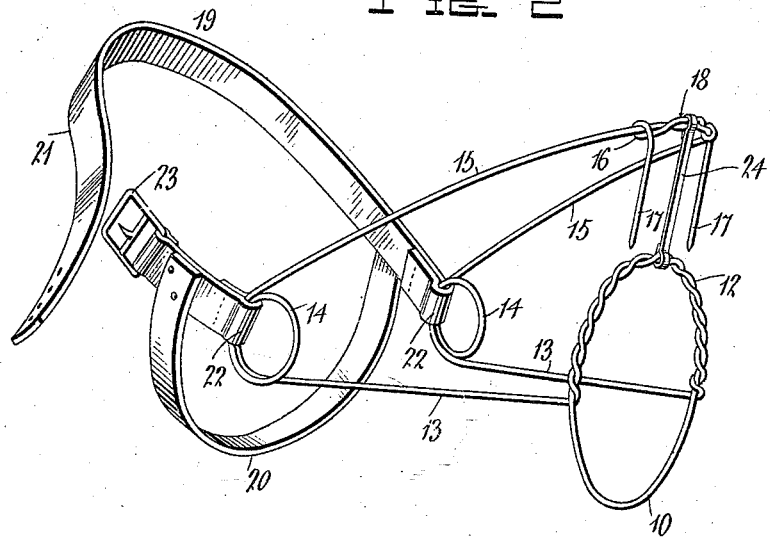
Figure 2:
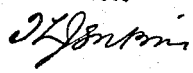
Figure 2:

In the accompanying drawings forming part of this specification:—Figure 1 is a side elevation of the device applied. Fig. 2 is a detail perspective view of the device.

Referring now to the drawing, the muzzle is seen to be formed from a single length of stiff wire bent intermediate its ends to form a ring 10 which is adapted to encircle the snout of the young animal above the nostrils, the terminals being crossed and wrapped about themselves to approximately the central portion of the ring as shown at 12, thence extended in parallelism rearwardly from the ring, as shown at 13, the straight portions adapted to extend upwardly upon the animal's snout in the direction of the eyes, each terminal being thence looped upon itself to form a spring coil 14, the terminals thence being directed forwardly in parallelism in the direction of the ring and forming resilient arms 15 that are inclined upwardly from the straight portions 13, the terminals being thence bent in the direction of each other and wrapped about each other as shown at 16, thence directed downwardly in the direction of the ring to form spurs 17, the points of which are adapted to prick the snout of the animal when the bases 18 of the spurs are brought into contact with the udder of the mother animal. For securing the device in position, a halter 19 is provided comprising a throat strap 20, the terminals of which are secured to a neck strap 21, the terminals of this strap being secured to the spring coils 14 as shown at 22 and this neck strap being equipped intermediate its ends with a buckle 23 by means of which the halter may be adjusted to fit the necks of various sized animals. It will be seen that this muzzle will not prevent the animal from grazing and will, when the animal attempts to nurse, prick the animal itself rather than the mother. It will be observed that the spring arms 15 will normally hold the points of the spurs from contact with the animal and will return the spurs to operative position after each time the spurs are depressed by the animal attempting to nurse.

In order to guard against movement of the resilient arms 15 away from the ring 12, said arms and ring are connected together by means of a strap 24. This strap, as will be apparent, serves to always hold the arms 15 in position to be actuated at the proper time and renders the operation of the device positive.

What is claimed is:—

1. A muzzle comprising a snout encircling ring, spring arms connected to said ring and extending rearwardly therefrom, said arms having their free ends bent upwardly and forwardly and overhanging the ring, and equipped with spurs pointing in the direction of the ring, said spring arms being adapted to normally hold said spurs out of engagement with an animal's snout.

2. A muzzle comprising a snout encircling ring, spring arms extending rearwardly from the ring and comprising straight portions adapted to lie along an animal's snout, these portions being formed with spring coils on their extremities, the terminals thence being directed forwardly in the direction of said ring and being provided on their extremities with prongs that overlie and extend in the direction of said ring, and a halter secured to said coils for attaching the device to an animal.

In testimony whereof, I affix my signature, in presence of two witnesses.

FLORIAN W. WIDMANN.

Witnesses:
V. S. HIMSH,
B. J. KEPPERS.

Copies of this patent may be obtained for five cents each, by addressing the "Commissioner of Patents, Washington, D. C."